Oct. 19, 1954

R. S. VANIMAN 2,692,308

ROUTINE TEST CONNECTOR

Filed Aug. 11, 1951

2 Sheets-Sheet 1

*INVENTOR.*
ROBERT S. VANIMAN

BY

ATTORNEY

*INVENTOR.*
ROBERT S. VANIMAN

ATTORNEY

Patented Oct. 19, 1954

2,692,308

UNITED STATES PATENT OFFICE 2,692,308

ROUTINE TEST CONNECTOR

Robert S. Vaniman, Chicago, Ill., assignor to Automatic Electric Laboratories, Inc., Chicago, Ill., a corporation of Delaware Application August 11, 1951, Serial No. 241,471

17 Claims. (Cl. 179—175.25)

1

This invention relates in general to telephone line testing equipment; and in particular to an improved routine test connector for testing the line to line and line to ground insulation resistance of each line in a telephone system.

Accordingly, it is the main object of the invention to provide such a routine test connector circuit that will be faster and more positive in operation than those developed heretofore.

Another object is to provide for convenient installation of such a test connector in a vacant position in a switch bank.

Another object is to provide a test meter circuit which can be connected to the test connector itself, when a line fault is found, in order to ascertain the exact nature of the fault.

A feature of the invention resides in the passing over of busy lines in order to minimize the time required to test the entire bank.

Figure 1:
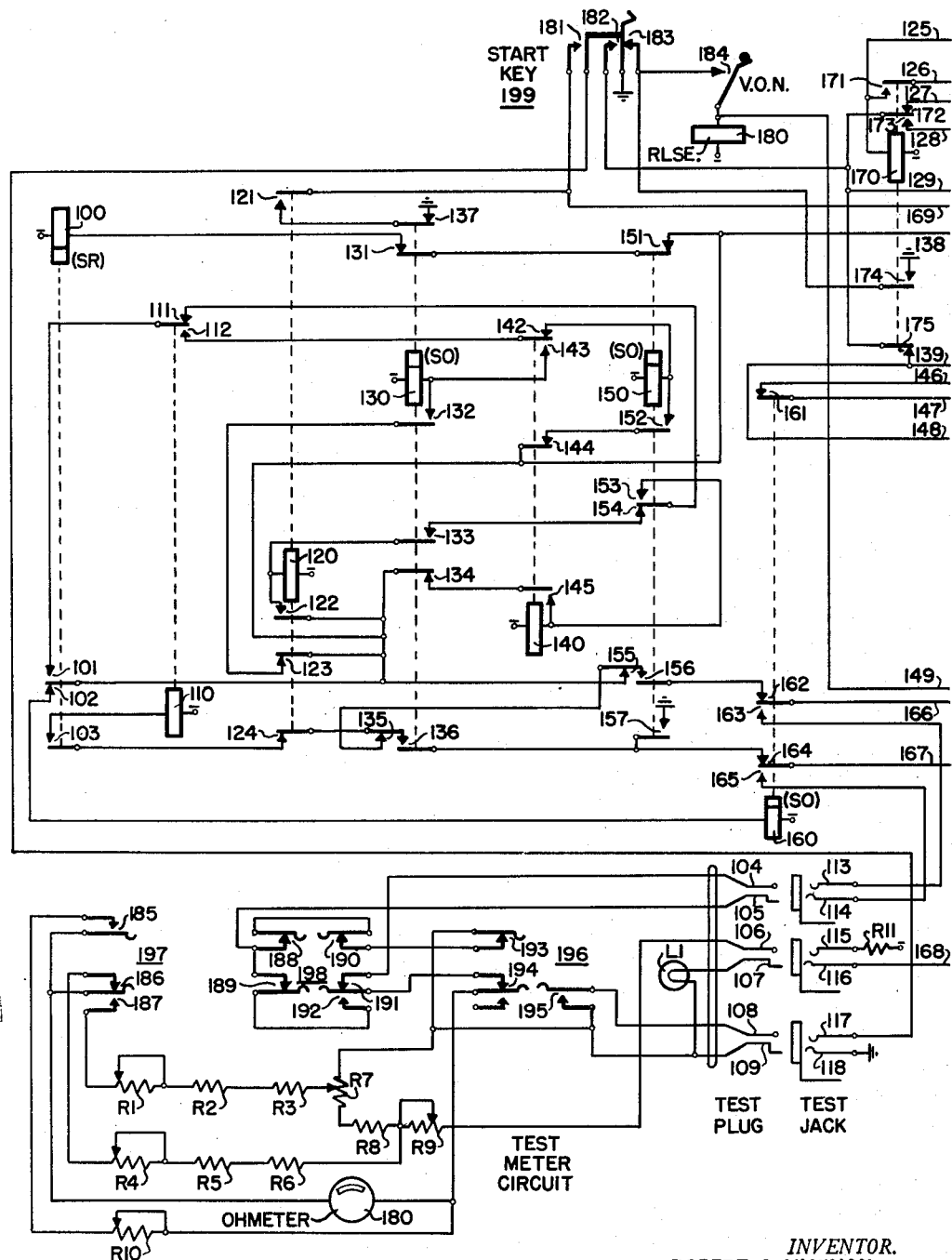
Figure 2:
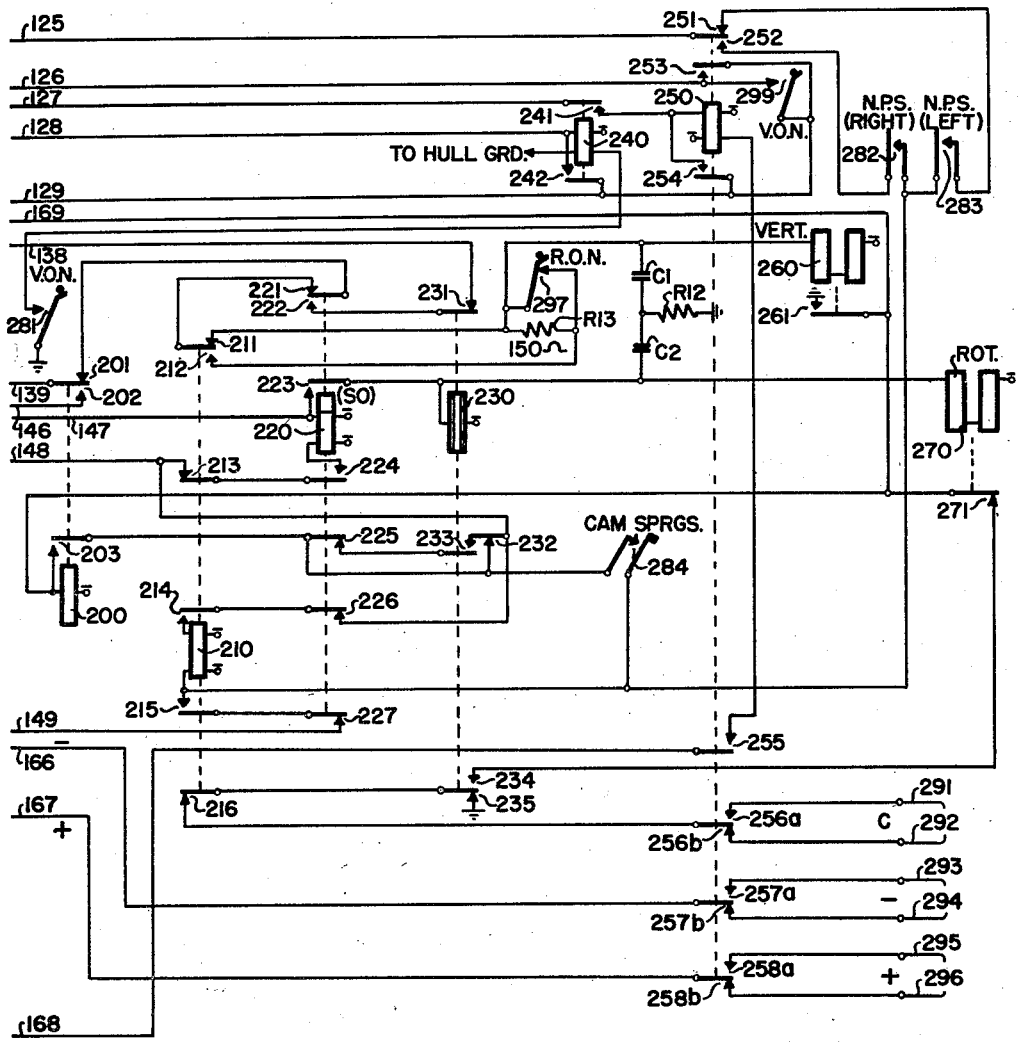

Other objects and features will be evident and a complete understanding of the construction and operation may be had from a perusal of the description in conjunction with the accompanying drawings, in which:

Fig. 1 shows the left half of the routine test connector circuit and the test meter circuit. Fig. 2 shows the right half of the routine test connector circuit.

Briefly, the test connector is so arranged that it can conveniently be mounted in a vacant 200-line connector position. Of course, with a slight modification the circuit would function equally well in a 100-line system. The inventor does not wish to be merely limited thereto. When operation of the test connector is initiated the wipers thereof step to the first position in the first level and test for a loop or ground fault. If a fault of less than 50,000 ohms resistance is encountered, the test connector will stop thereon; but otherwise will continue stepping automatically to test all the lines connected to the switch bank. This invention incorporates a test meter circuit, mounted in an auxiliary box, that can conveniently be plugged into the test jacks of the test connector in order to determine the exact nature and extent of the fault, if one is found. This test meter circuit also includes a restart key for restarting the test connector after it has been stopped by a line fault. The test connector circuit is arranged to skip busy or permanent lines without interference; it tests first 100-lines appearing on the lower bank and then the other 100-lines connected to the upper bank.

Having briefly described my invention a detailed description thereof immediately follows.

2

In order to start the test connector, start key 199 is operated. A circuit is therefore completed for the vertical magnets, over the following path: ground at contacts 182, contact 175, conductor 139, contacts 201, 221, 211, through vertical magnets 260 to battery. Vertical magnets 260 therefore operate and, in closing its interrupter contacts 261, connects ground to relay 200, thereby causing said relay to operate. The wipers, of course, are stepped to the first level. Relay 200, in operating and in therefore opening contacts 201, opens the previously traced operating circuit for vertical magnets 260, causing said magnets to restore; in closing contacts 202, causes relay 220 to operate, over the following path: ground at contacts 182, contacts 175, conductor 139, contacts 202, conductor 146, contacts 161, conductor 147, through relay 220 to battery; and in closing contacts 203, locks itself operated, over the following path: ground on contacts 182, contacts 175, conductor 148, contacts 232, 203, through relay 200 to battery. Relay 220, in operating and in therefore closing contacts 223, completes operating circuits to relay 230 and rotary magnets 270, over the following path: ground at contacts 182, contacts 175, conductor 139, contacts 202, conductor 146, contacts 161, conductor 147, contacts 223, through relay 230 and rotary magnets 270 to battery; and in closing contacts 224, locks itself operated, over the following path: ground at contacts 182, contacts 175, conductor 148, contacts 213, 224, through lower winding of relay 220 to battery. The rotary magnets, in therefore operating step the wipers over to the first line of the first level (lower bank). Relay 230, in operating and in therefore opening contacts 232, opens the previously traced locking circuit for relay 200. Relay 200, of course, in releasing opens the previously traced circuits to relay 230 and rotary magnets 270 at contacts 202. Relay 230, being of the slow-to-release type, remains operated momentarily, but rotary magnets 270 restore immediately.

Responsive to restoration of the rotary magnets, interrupter springs 271 completes a circuit from wiper C to relay 200, over the following path: lower C wiper 292, contacts 256B, 216, 234, 271, through relay 200 to battery. If the line is busy, the ground found on wiper C will operate relay 200. Relay 200 would then once again complete the circuits for relay 230 and rotary magnets 270, stepping the switch over to the next line. When the wipers come to rest on an idle line, relay 200 will not operate (there being no ground on the C lead encountered by C wiper 292), and relay 230 will finally release. When relay 230 does release, ground is connected to C wiper 292 from contacts 235 via contacts 216 and 256B to mark the line busy; and at contacts 231 the circuit is completed to relay 100, over the following path: ground at contacts 182, contacts 175, conductor 139, contacts 201, 222, 231, conductor 138, contacts 151, 131, through relay 100 to battery. Relay 100 therefore operates, and the line is ready for testing.

Relay 100, in operating and in therefore closing contacts 103, completes an operating circuit for relay 110, over the following path: ground at contacts 182, contacts 175, conductor 139, contacts 201, 222, 231, conductor 138, contacts 155, 135, 124, 103, through relay 110 to battery. Relay 110, in operating and in therefore closing contacts 112 completes a circuit to switching relay 150 from ground on conductor 138 (previously shown), contacts 101, 112, 142, through switching relay 150 to battery. Switching relay 150, in operating and in therefore opening contacts 151, opens the previously traced circuit to relay 100, in closing contacts 152, locks itself operated from ground on conductor 138, via contacts 144 and 152; in opening contacts 155 and in closing contacts 156, changes the connection of relay 110 (the test relay) from ground (via conductor 138) to the negative wiper, over the following path: negative wiper 294, contacts 257B, conductor 166, contacts 162, 156, 135, 124, 103 to relay 110. The circuit is now ready for its first test.

If the loop is not shorted or there is no ground on the negative line, relay 110 will release, thereby opening one of the multiple grounds to relay 150 at contacts 112. In closing contacts 111 a circuit is completed for relay 140, over the following path: ground on conductor 138, contacts 101, 111, 153, through relay 140 to battery. Relay 140 operates and, in opening contacts 144, disconnects the last ground from switching relay 150. Relay 150 restores before relay 100 (as relay 100 is of the slow-to-release type) and, in closing contacts 151, prevents said relay 100 from restoring. Relay 150 also, in restoring and in closing contacts 155, closes the previously traced operating circuit for relay 110. Relay 110 therefore operates and, in closing contacts 112, completes an operating circuit for changeover relay 130, over the following path: ground on conductor 138, contacts 101, 112, 143, through relay 130 to battery. Changeover relay 130 therefore operates and, in opening contacts 131, opens the previously traced operating circuit for relay 100; in closing contacts 132, locks itself operated from ground on conductor 138, via contacts 123; in opening contacts 134, opens the locking circuit of relay 140; and in opening contacts 135 and in closing contacts 136, transfers the connection of relay 110 (the test relay) from ground to the positive wiper, over the following path: positive wiper 296, contacts 258B, conductor 167, contacts 164, 136, 124, 103, to relay 110. The second test is now made.

If ground is not found on the positive line, relay 110 will restore and, in closing contacts 111, causes relay 120 to operate, over the following path: ground on conductor 138, contacts 101, 111, 154, 133, through relay 120 to battery. Relay 120, in operating and in therefore closing contacts 122, locks itself operated from ground on conductor 138; in opening contacts 123, opens the previously traced operating circuit for changeover relay 130; and in opening contacts 124, disconnects the positive line from relay 110. Changeover relay 130 therefore releases and, in closing contacts 131, maintains slow-to-release relay 100 operated; and in closing contacts 137, connects ground to relay 200, over the following path: ground at contacts 137, contacts 121, conductor 169, through relay 200 to battery.

Relay 200 therefore operates and, in closing contacts 203, locks itself operated over a circuit previously traced; in closing contacts 202, completes the previously traced operating circuits for relay 220 (upper winding), 230 and rotary magnets 270; and in opening contacts 201, opens the previously traced operating circuits for relays 120 and 130. The operation of rotary magnets 270 causes the wipers to be stepped to the next set of contacts. Relay 230, in operating and in therefore opening contacts 232, opens the previously traced holding circuit for relay 200. Relay 120 is now released, removing ground from relay 200 at contacts 121. Relay 200 releases and opens the previously traced operating circuits for relays 220 (upper winding), relay 230 and rotary magnets 270. Rotary magnets 270 and relay 230 restore, marking the line busy and connecting ground to relay 100 as previously described. Relay 100 operates and initiates the testing procedure as described hereinbefore.

Assuming all of the lines on that first level are fault-free, the routine test connector will automatically test each line as described hereinbefore. If the wipers move off the 10th rotary step to test the next line cam springs 284 operate. It may be noted at this time that the following relays are operated: 200, 220, 230, 120, 100, and rotary magnets 270. The closing of cam springs 284 prepares an operating circuit for relay 210. Relays 120 and 200 release as previously described and open the circuits to relay 230 and rotary magnets 270. Relay 100, after a delay, due to its slow-to-release nature, finally releases. Relay 210 operates, over the following path: ground at contacts 182, contacts 175, conductor 148, contacts 232, cam springs 284, through lower winding of relay 210 to battery. Relay 210, in operating and in therefore opening contacts 213, opens the circuit for the lower winding of relay 220, causing it to release, after a delay. Relay 220, in finally releasing and in therefore closing contacts 226, completes a holding circuit for relay 210, over the following path: ground at contacts 182, contacts 175, conductor 148, contacts 226, 214, through upper winding of relay 210 to battery. Relay 210, in closing contacts 212, completes an operating circuit for vertical magnets 260, through a 150 ohm resistor, over the following path: ground at contacts 182, contacts 175, conductor 139, contacts 201, 221, 212, resistor R13, through vertical magnets 260 to battery; and in closing contacts 215, connects ground to the release magnet 180, over the following path: ground at contacts 182, contacts 175, conductor 148, contacts 232, cam springs 284, contacts 215, 227, conductor 149, through release magnet 180 to battery. The release magnet operates, but because the vertical magnets are partially energized does not drop the shaft down. If the wipers move off the 11th rotary step, cam springs 284 open, removing ground from the release magnet, causing it to restore. When the shaft comes to rotary normal, its rotary off-normal springs 297 close, shunting resistor R13, and thereby placing direct ground to vertical magnets 260. The vertical magnets therefore fully operate and step the wipers up one level. Interrupter contacts 261 also close and connects ground to relay 200. Relay 200 therefore operates and causes relay 220 to operate as previously described. Relay 230 and rotary magnets 270 therefore operate and the lines of that second level are automatically tested as described hereinbefore. All of the remaining levels, of course, are routined in the same manner.

After testing the line connected to the last set of bank contacts of the first 100-line group, relay 200 will again operate from the ground at contacts 137 of relay 130. Relay 200 completes the circuit to the lower winding of relay 220, causing relay 230 and rotary magnets 270 to operate; and opens the circuits to relays 120 and 100. Rotary magnets 270 operate and step the shaft over to the 11th position, whereupon the cam springs operate. The closing of cam springs 284 prepares a circuit to relay 210 as previously described. Relay 120, 200, 230, 100, and rotary magnets 270 release as before. Relay 230 extends ground through the cam springs to relays 210 and 170, over the following path: contacts 182, 175, conductor 148, contacts 232, cam springs 284, and through the lower winding of relay 210 to battery, and also over the left normal post springs 283, contacts 251, through relay 170 to battery. It should be noted at this point that the left normal post springs are operated. Relays 210 and 170 therefore operate. Relay 170, in operating and in closing contacts 171, locks itself operated over the following path: ground at contacts 182, conductor 129, vertical off-normal springs 299, conductor 126, contacts 171, through relay 170 to battery; and in closing contacts 173, completes a circuit to relay 240, over the following path: ground at contacts 182, contacts 173, conductor 128, through relay 240 to battery. Relay 240 therefore operates and, in closing contacts 242, locks itself operated from ground at contacts 182 via conductor 129. The rotary magnets restore and the shaft returns to rotary normal. The cam springs 284 open, disconnecting the multiple ground from relays 210 and 170. Relay 170 now releases and in so doing completes a circuit to relay 250, over the following path: ground at contacts 182, contacts 172, conductor 127, contacts 241, through upper winding of relay 250 to battery. Relay 250 therefore operates and, in closing contacts 254, locks itself operated from ground at contacts 182 via conductor 129; in closing contacts 255, completes a circuit to a lamp in the test meter circuit, hereinafter described, indicating that the second 100-lines are being tested; and in closing contacts 256A, 257A, and 258A, switches the testing wipers to the second 100-lines on the upper bank. It might also be said at this time that when relay 170 restores, a circuit is completed to the vertical magnets 260 over the circuit previously described. Contacts 261 are closed thereby and in turn causes relay 200 to once again operate. The circuit now functions as described previously and the second 100-lines are routined.

After the last line connected to the last set of bank contacts of the second 100-lines has been tested, the shaft steps the wipers to the 11th contact and closes cam springs 284. This will effect operation of relay 210, as previously described, momentarily, and will cause operation of relay 170 over the following path: contacts 182, contacts 175, conductor 148, contacts 232, cam springs 284, right normal post springs 282, contacts 252, conductor 125, through relay 170 to battery. Relay 170, in closing contacts 174, connects ground to release magnet 180 via vertical off-normal springs 184; in opening contacts 175, removes ground from all the other relays in the routine test connector, except relays 240 and 250; and in closing contacts 171, locks itself operated, over the following path: ground at contacts 182, conductor 129, contacts 253, conductor 126, contacts 171, through relay 170 to battery. The switch returns to normal and vertical off-normal contacts 184 open, removing ground from the release magnet and relay 210, restoring both. Relays 170, 240, and 250 remain operated until the start key is released manually.

It should be remembered that up until this point in the explanation it has been assumed that all of the lines tested have been found to be free from fault. If the loop is shunted or if ground is found on the positive or negative lines, relay 110 will not release when it is transferred from ground to the positive or negative line (depending on which test is being made). Relay 110, remaining energized, prevents relays 120 or 140 from cutting off the holding grounds to relays 150 or 130, respectively. This will maintain either relay 150 or 130 operated, holding the circuit of relay 100 open. Relay 100 therefore finally releases and, in closing contacts 102, completes a circuit to relay 160 from ground on conductor 138. Relay 160, in operating and in therefore opening contacts 161, opens the previously traced operating circuit for rotary magnets 270; and in closing contacts 163 and 165 and in opening contacts 162 and 164, transfers the lines from the routining relays to the test meter circuit. The test connector has therefore stopped on the faulty line.

The test meter circuit may now be plugged into the test connector, in order to ascertain the exact nature of the line fault. It should be noted that at this time that the following relays are operated: 220, 160, 130, or 150. With all of the keys in the test meter circuit in their normal positions the test set is prepared for resistance measurements on the high resistance scale on the ohmmeter, (50,000 ohms midscale in the illustrated embodiment). The circuit for the ohmmeter is traced over the following path: positive line 167, contacts 165, contacts 114 of the test jack, contacts 105 of the test plug, contacts 188, 190, 193, resistors R7, R8, R6, R5, R4, contacts 186, through meter 180, contacts 194, 191, contacts 104 of the test plug, contacts 113 of the test jack, contacts 163, to negative line 166. Voltage to operate the ohmmeter is impressed on the circuit over the following path: ground at contacts 118 of the test jack, contacts 109 of the test plug, resistors R7, R8, R9, contacts 106, contacts 115, resistance R11 to battery. Resistors R7 and R8 therefore form a voltage divider network to obtain voltages less than exchange battery voltage. Resistor R9 is the well known "zero adjust" resistor for facilitating the calibration of the ohmmeter. In order to measure resistance on a lower scale, (500 ohms midscale), the "low scale" key 197 is manually operated. Resistor R10 is therefore shunted across ohmmeter 180 via contacts 185; and the positive line is now connected to the meter via resistors R1, R2, and R3. Thus, the resistance across the faulty line may be determined on either one of two scales of the ohmmeter.

In order to test for ground on the negative side of the line, key 198 is manually operated to the left. The circuit for meter 180 is now traced over the following path: negative conductor 166, contacts 163, 113, 104, 191, 194, through meter 180, contacts 186, resistors R4, R5, R6, R8, R7, contacts 109 of the test plug, to ground at contacts 118 of test jack. The meter will now determine the resistance of any faults (grounds) on the negative line. Of course, by operation of key 197 a reading on the lower scale may be obtained.

To test for ground on the positive side of the line, key 198 is manually operated to the right. The positive line 167 is therefore connected to a meter over the following path: contacts 165, 114, 105, 189, 192, 194, meter 180, contacts 186, resistors R4, R5, R6, R8, R7, contacts 109, to ground at contacts 118. The meter will now determine the resistance of any faults on the positive line.

After the test has been made on the faulty line, the test connector may be restarted to routine the remaining lines by operating key 196 to the right. Ground is therefore connected to relay 200 over the following path: ground at contacts 118, contacts 109, 195, 108, 117, 181, conductor 169, through relay 200 to battery. Relay 200, in opening contacts 201, opens the operating circuit for relay 160, causing it to restore. The opening of contacts 201 also opens the circuit of either relay 130 or 150, determined by which test showed trouble on the line. Relay 160, in restoring and in therefore closing contacts 161, completes the circuits for relays 220 and 230 and rotary magnets 270. The test connector therefore steps over and routines the remaining lines in the same manner as hereinbefore described.

While there has been described what is at present considered to be the preferred embodiment of the invention it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is:

1. In a test connector having access to a bank of contacts for testing the insulation resistance of each telephone line connected to contacts in said bank, means included in said connector for stepping the wipers thereof to the first position in the bank, testing means included in said connector for thereafter testing the line connected to th contacts in said position for the insulation resistance; means included in said connector for thereafter automatically stepping the wipers to each one of the remaining positions, said testing means operative to test the insulation resistance of each line connected to the bank contacts; means controlled by said testing means for preventing further stepping of the wipers when a faulty line is found, and a test meter circuit for determining the exact resistance of the faulty line.

2. In a test connector switch mountable in a connector position of a multiple switch bank, said switch having vertical and rotary movements, and having wipers operable to seize each of a plurality of subscriber lines terminating in bank contacts arranged in a plurality of levels, each level having a plurality of positions; a starting means in said connector; a vertical stepping magnet operated responsive to the operation of said starting means to raise said wipers to the first level; an interrupter relay in said connector operated responsive to the operation of said vertical stepping magnet and causing the release thereof; a time-delay relay in said connector operated responsive to the operation of said interrupter relay after the full release of said vertical stepping magnet; a test-initiating relay in said connector operated responsive to the operation of said time-delay relay for restoring the interrupter relay; a rotary stepping magnet also operated responsive to the operation of said time-delay relay to step said wipers to the first position in said first level; contacts controlled by said interrupter relay to restore said test-initiating relay and said rotary stepping magnet; a test relay in said connector; a relay test circuit in said connector completed responsive to the release of said test-initiating relay and by which said test relay is connected to and tests the insulation resistance of the line connected to the contacts of said first position if said line is idle; a rotary-step-initiating relay in said connector operated responsive to the release of said test relay upon completion of the line insulation test if no fault has been found; a first relay means in said connector operated responsive to the operation of said rotary-step-initiating relay to step the wipers to the next position in said level; a second relay means in said connector operated responsive to the operation of the testing circuit if the line connected to said first position is faulty, said second relay means preventing further stepping of said wipers; and a third relay means operated when a busy line is found for continuing the operations without testing said busy line.

3. A test connector as claimed in claim 2, wherein the operation of said test relay, said relay test circuit, said rotary-step-initiating relay, and said first and third relay means are continued and are effective for rotary stepping of said wipers and for testing all the idle lines connected to the contacts in said first level.

4. In a test connector as claimed in claim 3, a release magnet in said connector; a fourth relay means in said connector effective after the rotation of said wipers from the last bank contact in said first level for operating said release magnet and for partially energizing said vertical stepping magnet to restore said wipers in only a rotary direction; a fifth relay means operated in response to the rotary restoration of said wipers for fully operating said vertical stepping magnet to raise said wipers to the second level of said bank contacts; said interrupter relay again operating in response to the operation of said vertical stepping magnet to initiate repetition of the rotary-stepping and the testing operations.

5. A test connector as claimed in claim 4, in which there are a plurality of levels arranged in a first and a second group of levels, said test connector also having a second set of wipers having access to said second group of levels, a group switching relay in said connector; means in said connector for restoring the wipers to vertical and rotary normal; means whereby said last means is operated responsive to the termination of testing of all the idle lines in said first group; means in said connector for operating said group switching relay to connect said second group of wipers to the testing means so as to permit testing of the idle lines connected to the contacts of said second group; means whereby said last means is operated and effective upon the restoration of the wipers; and means in said connector for thereafter testing each idle line of the second group.

6. A test connector as claimed in claim 5 and a test meter circuit connectable to said connector when a fault is found for determining the exact resistance of the faulty line, and manually controlled means in said circuit for re-starting the connector in order to test the remaining lines.

7. A test connector as claimed in claim 2 and a test meter circuit connectable to said connector when a fault is found for determining the exact resistance of the faulty line, and manually controlled means in said circuit for re-starting the connector in order to test the remaining lines.

8. In a test connector having a first and a second set of test wipers having access to a first and a second group of subscriber lines respectively, said first set of wipers normally effective for connecting said first group of lines to said test connector and said second set of wipers normally ineffective, means for advancing said wipers to engage succeeding lines accessible thereto to thereby cause said first set of wipers to successively connect the lines accessible thereto to the test connector, means operated upon the wipers having been advanced over all of said lines for restoring the wipers to normal, means for rendering said first set of wipers ineffective and said second set of wipers effective for connecting said second group of lines to the test connector, means whereby said last means is operated in response to said restoration of the wipers, said first means again effective for advancing said wipers to engage succeeding lines accessible thereto to thereby cause said second set of wipers to successively connect the lines accessible thereto to the test connector, a test relay, an operating circuit for said test relay, means operated in response to the connection of each idle line to the test connector for completing said operating circuit thereby to operate said test relay, a test circuit including the negative side of each idle line connected to the test connector for testing for faults on said each connected line, a switching relay operated responsive to the operation of said test relay for transferring said test relay from said operating circuit to said test circuit, said test circuit effective for maintaining said test relay operated only if the negative line to ground resistance or the line to line resistance is less than a predetermined value and for permitting restoration thereof in case said resistance is greater than said value, means including said switching relay operated responsive to the restoration of said test relay for again including the test relay in said operating circuit thereby to reoperate said test relay, another test circuit including the positive side of each said connected idle line for testing for faults on each said connected line, a changeover relay operated responsive to the reoperation of said test relay for transferring said test relay from said operating circuit to said other test circuit, said other test circuit effective for maintaining said test relay operated only if the positive line to ground resistance is less than the predetermined value and for permitting restoration thereof in case said resistance is greater than said value, means operated responsive to the said last restoration of said test relay for operating said first means to advance the wipers one step, and means operated whenever the test relay is maintained operated by one of said test circuits for preventing further advancement of the wipers.

9. A test connector as claimed in claim 8, including a test meter circuit, means for connecting said meter circuit to said connector when a fault is found for determining the exact resistance of the faulty line, and manually controlled means in said circuit for re-starting the connector when said circuit is connected thereto in order to test the remaining lines.

10. A test connector as claimed in claim 1 wherein said testing means comprises a test relay and a pair of test circuits for said relay, means for connecting said test relay to one of said test circuits to test the line to line resistance and the negative line to ground resistance, and means for thereafter connecting said test relay to the other test circuit to test the positive line to ground resistance.

11. In a test connector having access to a bank of contacts for testing the insulation resistance of each telephone line connected to contacts in said bank, means included in said connector for stepping the wipers thereof to the first position in the bank, testing means included in said test connector for thereafter testing the line connected to the contacts in said position for insulation resistance; means included in said connector for thereafter automatically stepping the wipers to each one of the remaining positions, said testing means operative to test the insulation resistance of each line connected to the bank contacts; and means controlled by said testing means for preventing further stepping of the wipers when a faulty line is found.

12. A test connector as claimed in claim 11 wherein said testing means comprises a test relay and a pair of test circuits for said relay, means for connecting said test relay to one of said test circuits to test the line to line resistance and the negative line to ground resistance, and means for thereafter connecting said test relay to the other test circuit to test the positive line to ground resistance.

13. In an automatic test connector having access to a bank of contacts for testing the insulation resistance of each telephone line connected to contacts in said bank, a testing means included in said connector for testing each line connected to the contacts for insulation resistance, a start means in said connector, means controlled by said start means for operating said connector to connect said testing means by way of said bank contacts to the first idle line encountered by said connector, means in said connector whereby said testing means is operated and effective in response to the connection of each idle line to the connector for testing the insulation resistance of said each idle line, means included in the connector operated responsive to a satisfactory testing of each idle line for operating said first means to cause the connector to connect said testing means to the next idle line, and means controlled by said testing means for preventing further operation of the connector when a faulty line is found.

14. A test connector as claimed in claim 13 wherein said testing means comprises a test relay and a pair of test circuits for said relay, means for connecting said test relay to one of said test circuits to test the line to line resistance and the negative line to ground resistance, and means for thereafter connecting said test relay to the other test circuit to test the positive line to ground resistance.

15. For use in a connector position of a multiswitch bank to which bank are connected a plurality of telephone subscriber lines, a test connector having access to said subscriber lines, a line insulation testing circuit included in said connector, stepping means included in said connector for sequentially connecting said insulation testing circuit to each idle one of said subscriber lines, means including in said connector and controlled over said testing circuit for preventing further stepping of said test connector if the insulation resistance of a connected line is less than a predetermined value.

16. In a test connector as claimed in claim 15, a test meter circuit for measuring the exact resistance of a faulty line.

17. In a test connector having a set of test wipers having access to a group of subscriber lines, means for advancing said wipers to engage succeeeding lines accessible thereto, thereby to connect the lines to the test connector, a test relay, a first circuit for said test relay, means operated in response to the connection of each idle line to the test connector for completing said first circuit thereby to operate said test relay, a test circuit including the negative side of each idle line connected to the test connector, a switching relay operated responsive to the operation of said test relay for transferring said test relay from said first circuit to said test circuit, said test circuit effective for maintaining said test relay operated only if the negative line to ground resistance or the line to line resistance is less than a predetermined value and for permitting restoration thereof in case said resistance is greater than said value, means including said switching relay operated responsive to a restoration of said test relay for transferring said test relay from said test circuit back to said first circuit thereby to reoperate said test relay, another test circuit including the positive side of each said connected idle line, a changeover relay operated responsive to the reoperation of said test relay for transferring said test relay from said first circuit to said other test circuit, said other test circuit effective for maintaining said test relay operated only if the positive line to ground resistance is less than a predetermined value and for permitting restoration thereof in case said resistance is greater than said value, means operated responsive to a latter restoration of said test relay for operating said first means to advance the wipers one step and means operated whenever the test relay is maintained operated by one of said test circuits for preventing further advancement of the wipers.

References Cited in the file of this patent

UNITED STATES PATENTS

| Number | Name | Date |
|---|---|---|
| 1,632,048 | Van de Water et al. | June 14, 1927 |
| 2,393,236 | Corey et al. | Jan. 22, 1936 |
| 2,545,551 | Koch | Mar. 20, 1951 |